Dec. 27, 1966     A. G. BLANK ETAL     3,293,768
TREATING FLUIDIZED MATERIAL
Filed March 13, 1964                5 Sheets-Sheet 1

INVENTORS:
ALBERT G. BLANK
JOHN F. SCOTT
BY Howson & Howson
ATTYS.

Dec. 27, 1966　　　A. G. BLANK ETAL　　　3,293,768
TREATING FLUIDIZED MATERIAL
Filed March 13, 1964　　　　　　　　　　　　5 Sheets-Sheet 2
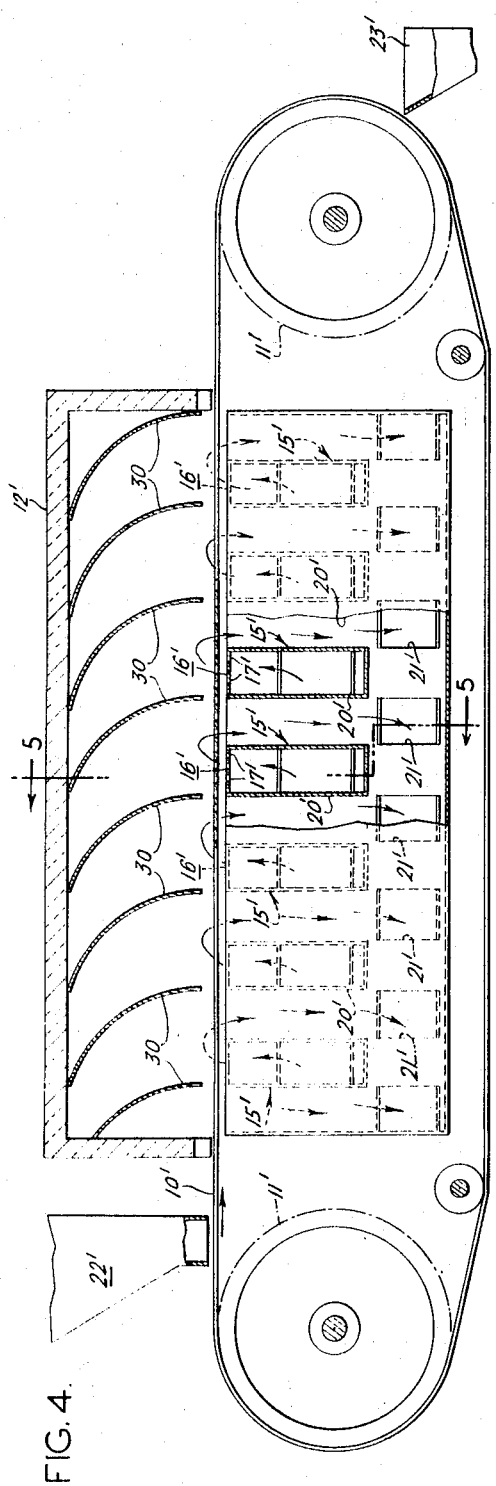
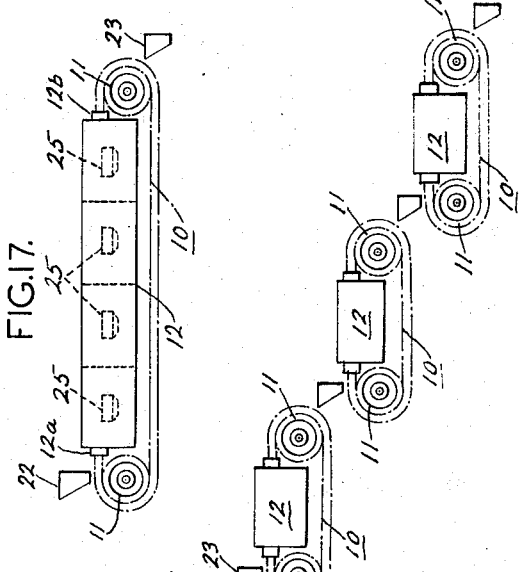
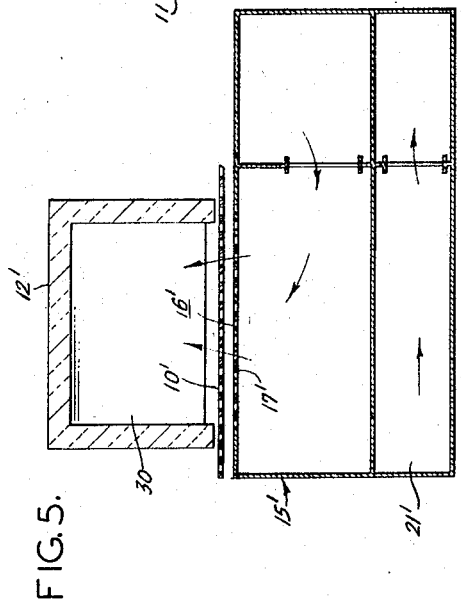
INVENTORS:
ALBERT G. BLANK
JOHN F. SCOTT
BY Howson & Howson
ATTYS.

Dec. 27, 1966  A. G. BLANK ETAL  3,293,768
TREATING FLUIDIZED MATERIAL
Filed March 13, 1964  5 Sheets-Sheet 4

INVENTORS:
ALBERT G. BLANK
JOHN F. SCOTT
BY Howson & Howson
ATTYS.

Dec. 27, 1966     A. G. BLANK ETAL     3,293,768

TREATING FLUIDIZED MATERIAL

Filed March 13, 1964     5 Sheets-Sheet 5

INVENTORS:
ALBERT G. BLANK
JOHN F. SCOTT

BY Howson & Howson

ATTYS.

3,293,768
TREATING FLUIDIZED MATERIAL
Albert G. Blank, Huntingdon Valley, and John F. Scott, Oreland, Pa., assignors to Proctor & Schwartz, Inc., Philadelphia, Pa., a corporation of Pennsylvania
Filed Mar. 13, 1964, Ser. No. 351,810
21 Claims. (Cl. 34—10)

This invention relates to method and apparatus for treating fluent solid materials with fluidizing gases, and has for an object the provision of improvements in this art. This application is a continuation-in-part of copending application, Serial No. 227,904, filed October 2, 1962, now abandoned.

The apparatus and method are especially adapted for drying or otherwise treating fluent solid materials such as cereals, chemicals, tobacco or other substances. The treatment is adapted to improve the product and speed up the production rate by simple and relatively inexpensive apparatus and method.

One usual procedure for drying or treating fluent solid materials is to deposit a wet material upon a foraminous conveyor or perforate support and to advance the material along while blowing heated air through or across it, the air being returned to heating (or cooling) and/or drying means and recirculated.

Such treatment is used for toasting, puffing, cooling, curing, conditioning, or treatment involving chemical or physical reactions on a product.

According to the present invention the material is subjected to a gaseous treatment which lifts or levitates and agitates the material followed by a return of the treating gas through the material in a reverse direction. The lifting upflow and return downflow is repeated a number of times.

The upflowing gas at every place supplied is conditioned gas and the downflowing gas is restricted to a return path through the material adjacent an upflowing stream of gas. The space both below and above a perforate support conveyor which moves the material through the treating chamber is so compartmented that at least a part of each stream of upflowing gas is caused to return through the material locally to return gas ducts immediately adjacent the supply duct; and each stream of downflowing gas is withdrawn through a gas main return duct beneath the conveyor so that it cannot return immediately through the bed of material. This arrangement provides that the gas, after making one trip upward and downward through the bed is not returned unless it first passes through the reconditioning means. Material is dropped out of suspension and back to the bed of material by the return downflow of the gas.

In one form of the invention in which there is a return flow through the bed of material part of the gas is exhausted to the atmosphere after it returns through the bed of material; in another form of the invention part of the gas is exhausted to the atmosphere after it passes upward through the bed of material. A benefit of the latter arrangement is that the volume of gas returning through the material is less than the volume of upflowing gas, and, for equal flow areas, the velocity of downflowing gas is less than the velocity of upflowing gas. This aids the deposit of material on the bed without drawing it down through the bed.

Another arrangement for inducing the dropping of material out of suspension provides for reducing the velocity of the upflowing gas after it passes through the bed of material by increasing the flow space for the upflowing gas provided by the flow directing compartmentization above the conveyor.

Both arrangements may be combined, the upflow space being increased and the volume of downflow return gas being decreased.

The comparted arrangement for increasing the gas flow space and reducing the gas flow velocity above the perforate bed-supporting means will serve not only when the return flow is reduced by a small amount but also when it is reduced by a greater amount or even when the return flow is not needed at all, with only upflow over a given length of the perforate bed-supporting means up to the length of the treating enclosure. This is especially feasible when, as will be disclosed, a flexible perforate sheet-like material-retaining screen is provided which closely fits above the compartments to retain the material and allow the upflowing gas to escape. The closely fitting screen, of course, will retain material even if its upward velocity has not been decreased.

In a preferred form of the invention, the conveyor carries a continuous series of compartment forming means with perforate bottoms and imperforate sides so arranged that there is substantially no passage of upflowing and downflowing gases except through the perforate bottoms of the compartments and the material carried thereon. In a specific arrangement, the compartments are formed as separate boxes or baskets whose transverse walls form a barrier to gas passage between boxes, the box end walls forming with the enclosure a barrier against the passage of gas around the ends of the boxes.

In addition to reducing the velocity of the upflowing gases and reducing the volume of downflowing gases to return the material after it has been fluidized or levitated, there may also be provided an overhead screen to prevent the displacement of material out of local zones on the conveyor or its escape from the conveyor. This is particularly useful when some or all of the used gas is exhausted above the conveyor without returning it back through the conveyor.

The invention further provides apparatus and method for varying the gas lifting velocity proportionately to the change in weight of the material, either in different units or in different zones of one unit.

In order to provide a better understanding of the invention, its objects, features of novelty and advantages, certain exemplary embodiments will be described herein, reference being made to the accompanying drawings, wherein:

FIG. 4 is a diagrammatic vertical longitudinal section of another form of apparatus embodying the invention;

FIG. 5 is a transverse vertical section taken on the line 5—5 of FIG. 4;

FIG. 16 shows a plurality of machines arranged to treat material successively at different gas velocities;

FIG. 17 shows a single machine arranged to treat material in different sections successively at different gas velocities.

Figure 1:
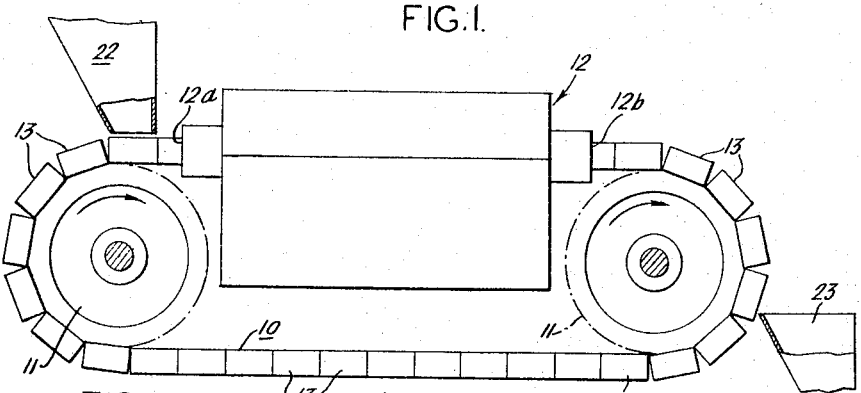
FIG. 1 is a side elevation of one form of apparatus embodying the invention.
Figure 2:
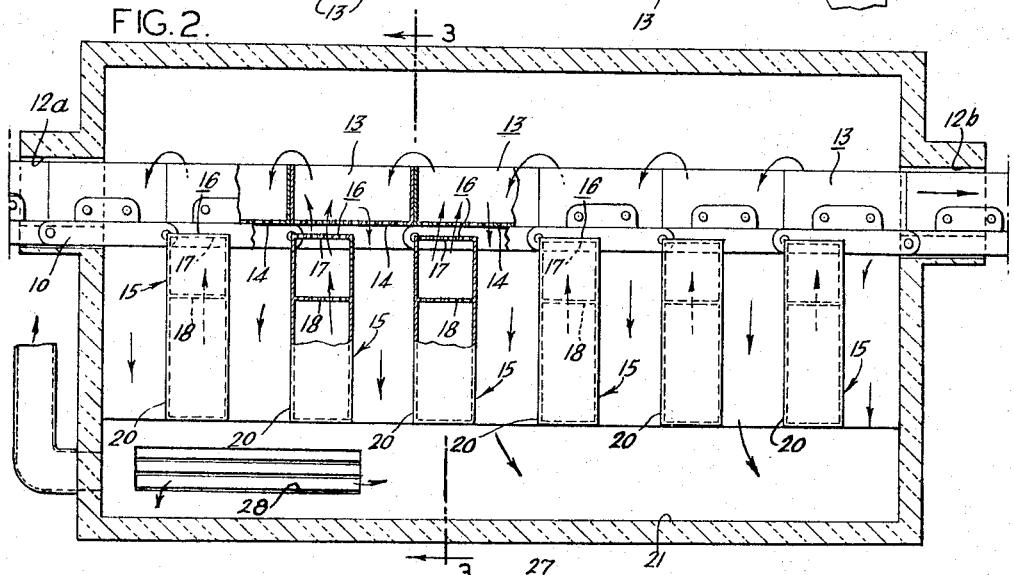
FIG. 2 is an enlarged diagrammatic vertical longitudinal section taken at the upper mid-portion of FIG. 1.
Figure 3:
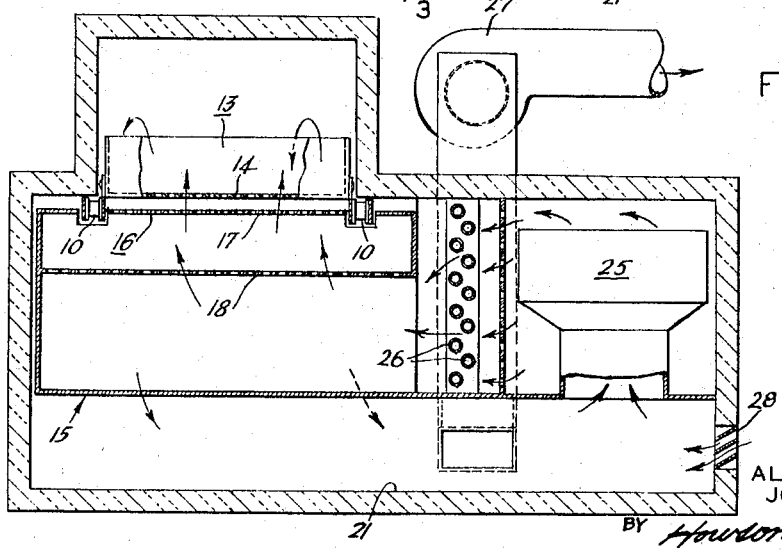
FIG. 3 is a transverse vertical section taken on the line 3—3 of FIG. 2.
Figure 6:
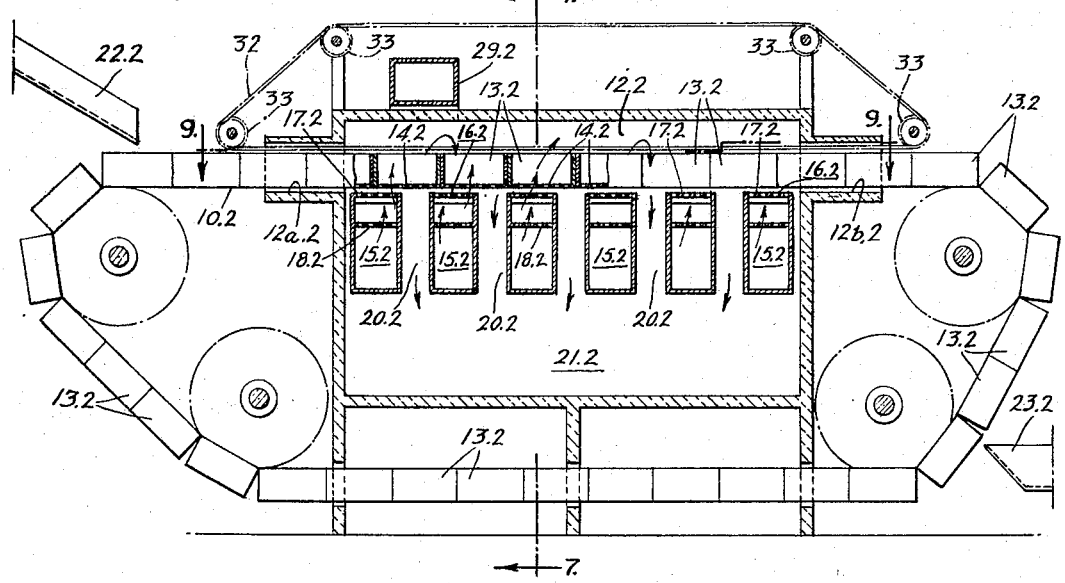
FIG. 6 is a somewhat diagrammatic vertical longitudinal section of another embodiment, the section being taken on the line 6—6 of FIG. 7.
Figure 7:
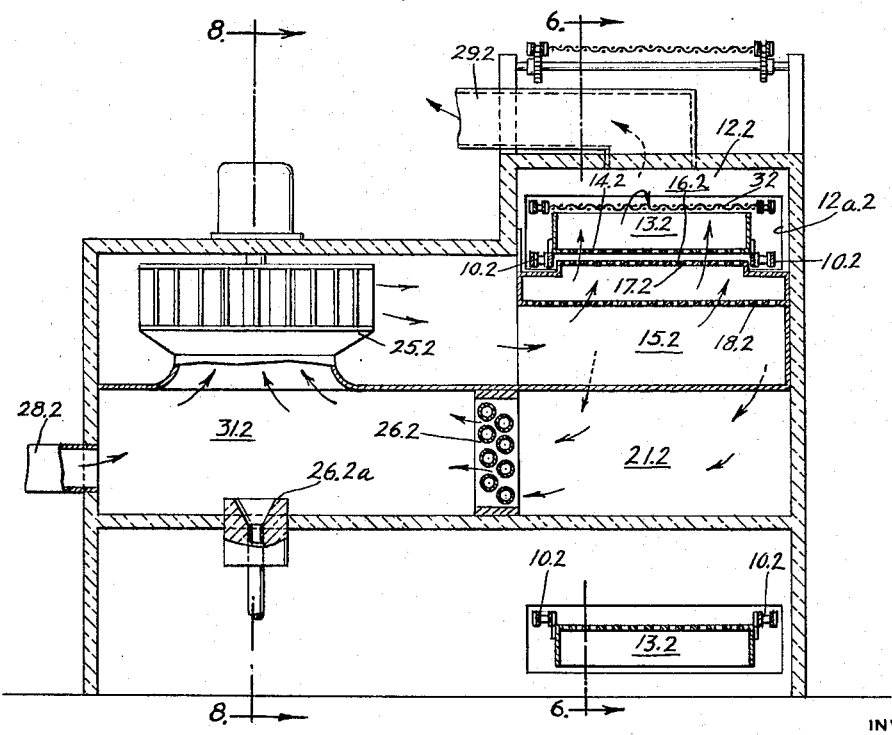
FIG. 7 is a transverse section taken on the line 7—7 of FIG. 6.
Figure 8:
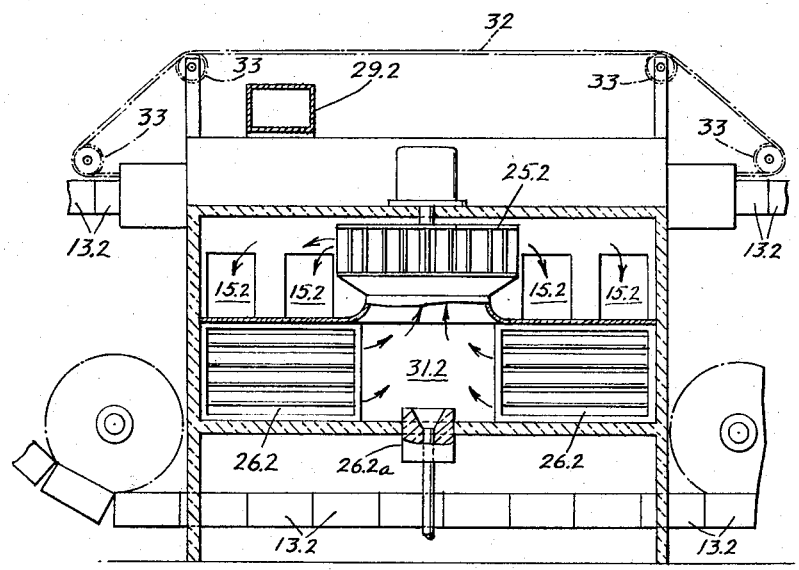
FIG. 8 is a vertical longitudinal section taken on the line 8—8 of FIG. 7.
Figure 9:
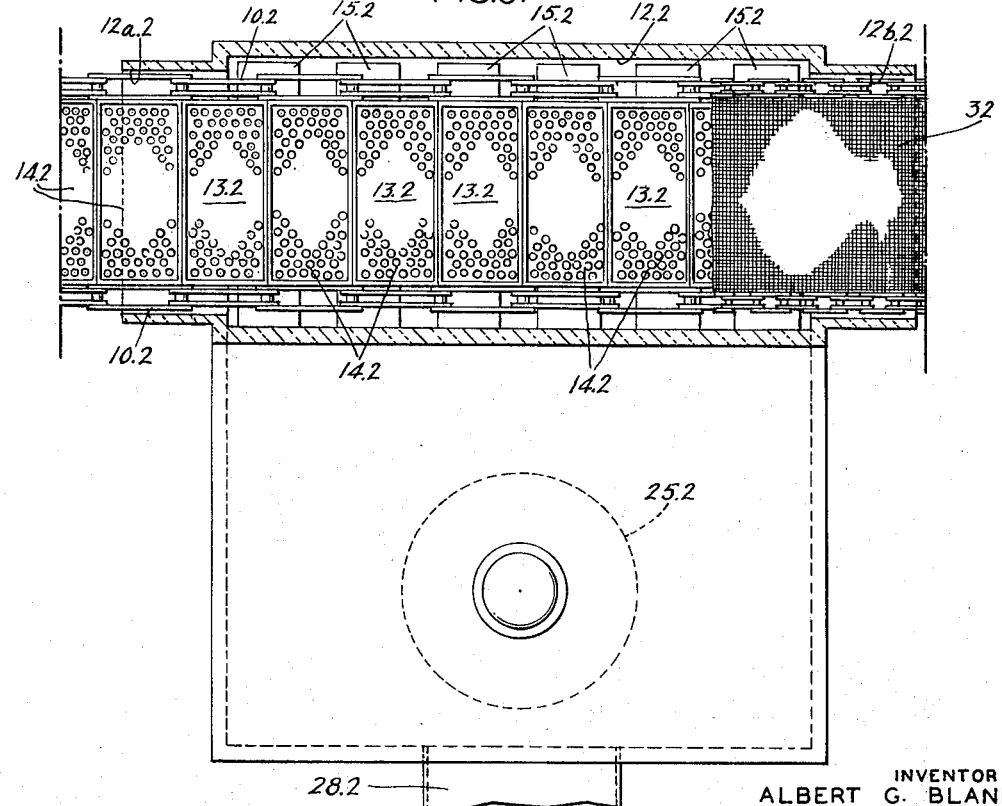
FIG. 9 is a horizontal section taken on the line 9—9 of FIG. 6.

As shown in FIGS. 1–3, an endless conveyor belt 10 is carried by supporting wheels 11 and driven by any suitable motive means to travel through a heat insulated treating chamber 12. A plurality of boxes 13 with perforate bottoms 14, suited to the particular material being treated, are carried on the belt 10.

At spaded locations longitudinally beneath the belt 10 within the chamber 12 there are provided a plurality of parallel conditioned gas supply ducts 15 having outlets 16 below the path of travel of the belt. Perforated plates 17 and 18 in the ducts 15 spread the gas evenly beneath the conveyor belt.

Between the gas supply ducts 15 there are gas return ducts 20 leading to a gas return main duct 21.

Material to be treated is supplied to the boxes 13 by a feed chute or hopper 22 and material is discharged at a delivery chute 23. Instead, if desired, filled boxes may be put on the belt on one side of the enclosure and removed on the other side, as by hand. The entrance opening 12a and the outlet opening 12b of the housing will be so arranged that there is only a minimum of gas leakage, either in or out here.

Supposing that heated air is to be used for treating the material, it may be forced in by a supply fan 25 and heated by a heating device 26. If moisture is taken from the material it may be removed before the air is returned; or part of the moisture laden exhaust air may be drawn off by an exhaust fan 27 and fresh make-up air may be supplied by a fresh air intake 28 in the side wall of the chamber 12.

In the form shown in FIGS. 4 and 5 the boxes are omitted and the material from the supply hopper 22' is carried directly on a perforate belt 10', and baffle partition plates 30 are provided within the enclosure or treating chamber 12' for controlling the movement of the gas and of the particles of material on the belt.

Other parts in FIGS. 4 and 5 which correspond to parts in FIG. 1 and 2 are designated by the same reference characters with a prime (') added.

In operation, a relatively thin layer of fluent material is carried on the perforate bottoms of the boxes 13 (or the belt carrying screen-bottomed boxes, if used, FIGS. 1–3) or on the perforate belt (FIGS. 4, 5), and the material moved on the belt through the enclosure. Gas from the supply ducts 15 is forced upward through the material above the duct outlets 16 with such pressure as to lift or levitate and spread the particles apart so as to expose all sides fully to the gas. The material will seem to boil above the duct outlets.

In these embodiments, substantially all of the gas is forced to return by way of the return ducts 20 and in doing so again passes through the bed of material, to drop material upon the bed, to remove more moisture, or provide further treatment to get the maximum benefit from the gas before it is discharged. On the second pass, however, the bed is more compact because the gas is forcing the material down on the screen-like support on which it is carried. The abrupt change in direction of the gas in being forced to return by way of the adjacent return ducts aids in the redeposit of material on the bed of material on the screen.

In the form shown in FIGS. 1 to 3 the gas passes around in both a forward direction and a rearward direction, reference being to the direction of belt movement, and in FIGS. 4 and 5 the gas passes solely or, at least predominantly, in a forward direction.

In all cases, however, there is at least one double passage of gas through the travelling bed of material, once with the bed particles in suspension by the gas (the degree of lift being adjusted in proportion to the change in weight of material, as desired, by changing the pressure of supplied gas) and once through with the bed pressed down on the belt.

In the embodiment shown in FIGS. 6–9, a screen belt 32 passes through the treating chamber 12.2 over the open tops of the boxes 13.2 as they are carried along on the coveyor belt 10.2 from adjacent the feed chute 22.2 through the entrance opening 12a.2 and outlet openings 12b.2. The screen belt 32 passes over pulleys 33 carried on suitably mounted shafts. The screen belt 32 may be driven by its engagement with the boxes 13.2 on the conveyor belt 10.2 or it may be separately driven to travel at the same speed as the boxes.

The screen belt 32 holds the material against flying upward out of the boxes 13.2 while still allowing it to be blown up and fluidized as the boxes pass over the gas supply ducts 15.2. Dust can pass out freely.

The exhaust duct outlet 29.2 for vitiated gases is placed in the top of the treating chamber, but part of the gases are returned back through the bed of material and the perforated bottoms 14.2 by way of the gas return ducts 20.2 and 21.2 to the air supply circulating fan 25.2 An exhaust fan may be provided for the exhaust gas outlet 29.2, if desired; although since located at the top, there may be a natural outflow of gases.

A heat exchange device 26.2, such as steam or liquid coils, is provided for the gases which are forced back up through the parallel supply ducts 15.2 and openings 16.2 of the upper perforated plates 17.2 of the supply ducts. A second heat exchange device 26.2a, such as a gas burner, is provided below the recirculating fan to be used to supplement the steam heating coils 26.2 or to be used in place of the steam coils when gas heat for the material is preferable or more convenient.

A make-up fresh air inlet 28.2 is provided in the plenum chamber 31.2. If more heating of the make-up air is desired, the air inlet can be located on the other side where the added air will be mixed with the downflowing return gas and reheated before being forced up by the fan. The make-up air, in any event, will be heated by being mixed with the hot gases supplied by the fan, the final temperature of the mixture being subject to control of the amount of heat supplied to the returned gases before being mixed with the make-up air.

It is not always necessary to heat the treating gases. Recirculation at room temperature with elimination at each flow cycle of part of the vitiated gas (as with moisture content) and the addition of intake air may be adequate for the treament desired.

If the amount of heat required is not great, waste heat from some other system may be used.

It may even be desirable to supply chilled gases, in which case the coil 26.2 can be supplied with a cooling instead of a heating medium.

As in the first embodiment (FIGS. 1–3) the conditioned gas is supplied through a series of longitudinally spaced parallel ducts through the bed of material to fluidize it as it travels along, some gas being returned directly down through the bed alongside the duct which delivered it to produce a kind of rolling action of the fluidized material, sometimes forwardly and sometimes rearwardly. As stated, the screen prevents material from flying out of the boxes toward the overhead exhaust, thus allowing high agitation of the material without losing any of it or allowing it to move out of local zones. The material stopped by the overhead screen drops back and is at once recirculated with the other material in the bed.

Another means for dropping material out of gas suspension is to expand the stream cross-section after it passes upward through the bed of material. The principle of expanding a stream area to reduce its velocity and drop material out of suspension is known and has been used in various ways but, so far as known, has never been used in an environment like that provided hereby.

Figure 10:
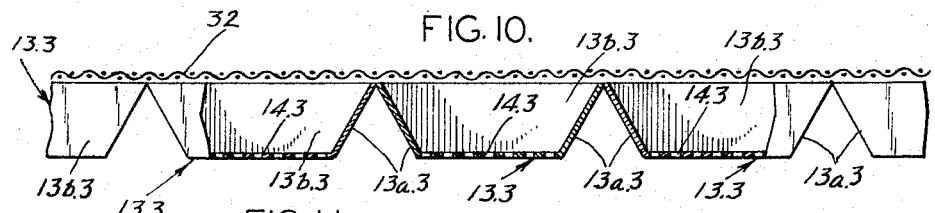
FIG. 10 is a partial vertical elevation showing a few conveyor boxes of a different type from those shown in previous forms.
Figure 11:
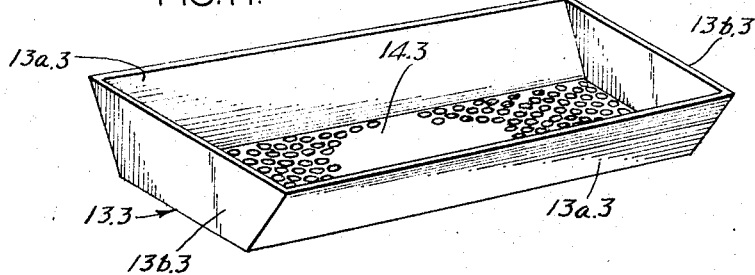
FIG. 11 is a top perspective view of one of the boxes shown in FIG. 10.

In one form, FIGS. 10 and 11, the box 13.3 is expanded longitudinally, having sloping fore and aft sides 13a.3 and vertical ends 13b.3. The top edges of the sides 13a.3 abut each other, as shown in FIG. 10, to cause all passing gases, upflowing or downflowing to travel through the perforate bottoms 14.3. The sides may be as wide as desired and sloped as much as desired to secure the required reduction in velocity; but the screen belt 32 may be retained to provide full assurance that no material will escape or shift its position so far along the length of the belt that it will fail to get the full treatment provided. The action is localized and repeated a number of times along the path of travel.

Figure 12:
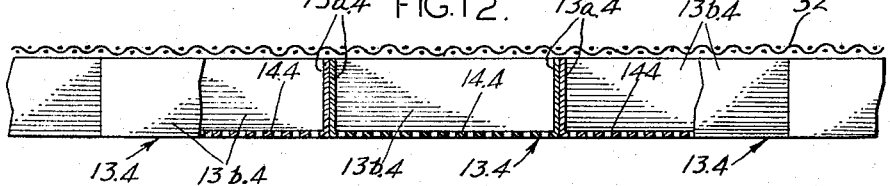
FIG. 12 is a view like FIG. 10 showing another type of conveyor box.
Figure 13:
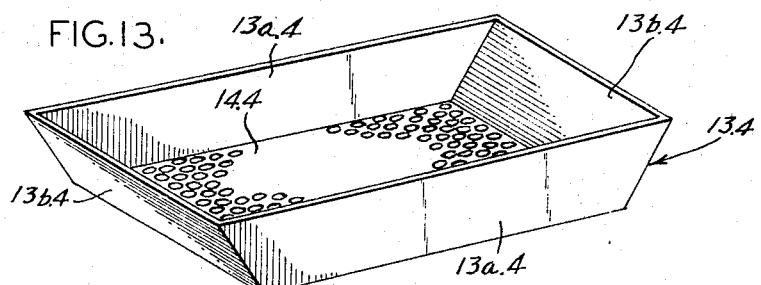
FIG. 13 is a top perspective view of one of the boxes shown in FIG. 12.

The boxes 13.4 shown in FIGS. 12 and 13 have straight or vertical sides 13a.4 and sloping ends 13b.4 to provide transverse expansion of the stream cross-section as it moves upwardly. This decreases the stream velocity more at the sides than along the interior and minimizes the rise of material at the sides, one benefit of which is to keep the material from getting into the hold-down guides for the overhead screen—when that is used.

Figure 14:
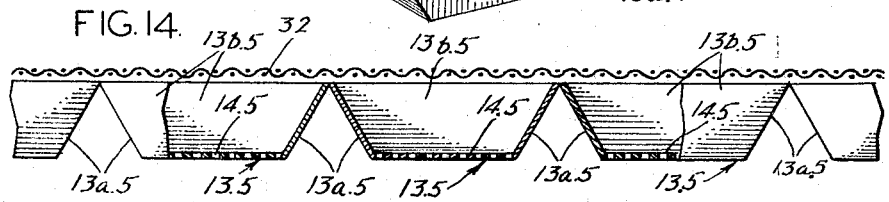
FIG. 14 is a view like FIG. 10 showing another type of conveyor box.
Figure 15:
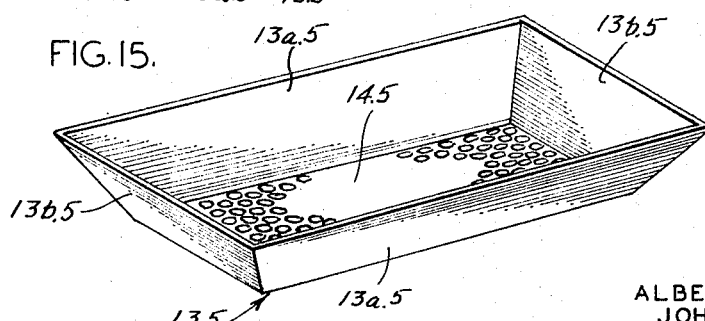
FIG. 15 is a top perspective view of one of the boxes shown in FIG. 14.

The boxes 13.5 shown in FIGS. 14 and 15 have both sloping sides 13a.5 and sloping ends 13b.5 to provide more rapid lateral expansion and reduction in velocity than the other forms.

In all forms the conditioned gas passes upward in a plurality of longitudinally spaced parallel streams of about the same velocity and of sufficient velocity to thoroughly fluidize or levitate the bed of material completely across the moving perforate support, the gas returning, at least in part, back through the bed locally to redeposit material close to the upflowing stream or streams which lifted it. This produces a rolling and turning action locally in separate zones at a number of spaced points along the length of travel of the bed. The apparatus provides suitable ducts below the perforate support and bed and suitable flow restricting structures above the perforate support to enforce this local zone turning action at a plurality of places along the length of travel. The structure and operation of the apparatus is such that none of the gas has more than two passes—one up and one down—before it is either returned to the reconditioning means or discharged from the apparatus.

Where the upflowing material is stopped by an overhead screen or is halted by the slow-down of the velocity of the upflowing gas it is not as important to have full-sized streams of downflowing gas to redeposit material on the bed, hence it is satisfactory to discharge some of the gas above the perforate support, as in FIGS. 6–9, after it has made only a single upward pass through the material. It is important to maintain some local streams of downflowing gas in order to provide an abrupt turning or arcing of some of the upflowing streams of gas to give the material the desirable local rolling or turnover action which is progressive throughout the length of the treatment path of the whole bed of material.

In all cases the boxes are longer along the length of the conveyor belt than the length of the gas supply ducts 15 and gas return ducts 20 in the same direction to assure that there will be part of an upflowing stream and part of a downflowing stream in each box length at all times to give the local rolling turnover action in the bed of material. In the examples shown, the length of each box at the bottom is approximately equal to the length of a supply duct and a return duct together; but this is not limiting.

This arrangement provides faster and more complete treatment and allows a deeper bed of material to be treated effectively than by former methods.

The apparatus used is also of a relatively simple nature. Even the enclosure openings for the perforate support do not require very involved gas sealing arrangements since the provision of gas withdrawal means for downflowing streams through the bed closely adjacent the gas supply means for upflowing streams through the bed produces a net gas pressure within the enclosure at the bed which may be maintained near atmospheric pressure so that there is little tendency for gas or air to flow in either direction through the conveyor openings. There is almost no gas flow for any considerable distance along the length of the bed.

The upwardly expanding compartments reduce the flow velocity of gas and material and may be adequate to retain all of the material in the travelling bed even when the flow of return gas is restricted or cut off altogether with only upflowing gas along the length of the conveyor. The flexible, perforate sheet-like screen engages the surrounding wall elements of the compartments and closely confines the material while allowing gases to flow upward therethrough, whether the downflow of gas is reduced or eliminated. The screens serve as a safety means to prevent escape of material particles above screen opening size whether the compartments are straight sided or flared to reduce the flow velocity.

If any particles, except small ones like dust, tend to pass out with the gas they will be caught in the bed in the return of the gas through it.

FIG. 16 shows how a plurality of treating chamber units 12 may be arranged to treat material successively with gas velocity changed proportionately with the change in weight of the material so that it will be lifted about the same height in each unit.

FIG. 17 shows how one conveyor belt may be arranged to carry material through a plurality of oven sections with different blowers and gas treating means in each section to provide gas supplies at different pressures for material of different conditions.

It is thus seen that the invention provides an improved method and apparatus for treating fluent materials for many purposes.

While certain embodiments of the invention have been described for purposes of illustration it is to be understood that there may be various other embodiments and modifications within the general scope of the invention.

I claim:

1. The method of treating fluent solid material, which comprises: moving the material along continuously in a bed on a travelling perforate bottom support, forcing conditioned gas upwardly through the material in a series of longitudinally spaced parallel streams along the length of travel of the support to lift and fluidize the material in each upwardly flowing stream of gas, and abruptly returning at least a part of the gas down through the bed of material in a plurality of downflowing streams intermediate the upflowing streams to redeposit material on the bed with a kind of rolling or tumbling of the fluidized material within the bed.

2. The method as set forth in claim 1 which further comprises forcing the conditioned gas upwardly through the bed of material at different pressures at different successive zones to fluidize it and raise it to approximately the same height as its weight changes with treatment.

3. The method as set forth in claim 1, which further comprises, increasing the stream cross-sectional area above the perforate bottom support to decrease its velocity to assist in returning material to the bed.

4. The method as set forth in claim 1, which further comprises, restricting the upward travel of material by a screen to aid its return with the abruptly turning stream of downflowing gas.

5. The method as set forth in claim 3, which further comprises, restricting the upward travel of material by a screen to aid its return with the abruptly turning stream of downflowing return gas.

6. The method as set forth in claim 1, which further comprises, directing a portion of each upflowing stream of gas to exhaust after it passes upwardly through said perforate bottom support to limit the volume of the downflowing streams returning through the bed of material.

7. The method as set forth in claim 1, which further comprises, restricting the flow of gas longitudinally of the path of travel above the travelling perforate bottom support to aid the abrupt return of the downflowing stream locally through the bed of material to produce a travelling local tumbling action in the bed of material at a plurality of places along the bed, first in one direction and then in a reverse direction.

8. The method as set forth in claim 1, which further comprises, restricting the path of movement of each stream of the upflowing gas after it passes upward through the bed of material to force it to flow predominantly in one direction relative to the path of travel of the bed of material.

9. Apparatus for treating fluent solid material, comprising in combination, an enclosed treating chamber, a conveyor supporting a bed of material on a perforate bottom support for passage through said enclosure, gas supply duct means beneath said conveyor at spaced points along the length of the path of travel of the bed of material on said conveyor through said chamber, means for supplying conditioned gas to said supply duct under sufficient pressure to levitate the material of the bed of material passing over the ends of said gas supply ducts, gas return duct means beneath said conveyor alternating with said supply duct means, gas flow guide means above said conveyor and bed arranged to direct at least a part of the upflowing streams of gas to return locally as downflowing streams through said bed of material and restricting the flow of gas and material to a limited zone along the conveyor, whereby the upflowing and downflowing streams in said zone effect a reversal of flow of at least part of said gas within said bed to thereby effect a kind of rolling or tumbling of the material in said bed, and means for arresting the upflow of material in the upflowing streams of gas after the initial upflow of material from the perforate bottom conveyor support.

10. Apparatus for treating fluent solid material as set forth in claim 9, in which said material arresting means comprises an overhead retaining screen located at a distance above the top level of material in repose.

11. Apparatus for treating fluent solid material as set forth in claim 10, which includes longitudinally spaced transverse partitions in the bed of material travelling along the conveyor, and in which said overhead screen engages and travels with said transverse partitions.

12. Apparatus for treating fluent solid material as set forth in claim 9, in which said material arresting means includes gas flow guide means above the conveyor which expands the streams laterally to reduce the flow velocity sufficiently to drop the material out of suspension.

13. Apparatus as set forth in claim 12, in which said flow guide means includes boxes with peripheral sides which slope outward in an upward direction.

14. Apparatus as set forth in claim 13, in which the fore and aft transverse peripheral sides of a box slope outward in an upward direction to expand the streams in a direction longitudinally of the perforate bottom support.

15. Apparatus as set forth in claim 13, which also includes an overhead screen covering the tops of said boxes.

16. Apparatus as set forth in claim 13, in which the boxes occupy the full space above the conveyor to force all gas streams moving up and down to pass through the boxes.

17. Apparatus as set forth in claim 9 wherein said means for supplying conditioned gas supplies gas at different pressures in different zones to fluidize the material and lift it to approximately the same height as required by change in weight with the gas treatment.

18. Apparatus for treating fluent solid material comprising in combination, an enclosed treating chamber, a conveyor supporting a bed of material on a perforate bottom support for passage through said enclosure, gas supply duct means having openings beneath said conveyor at spaced points along the length of the path of travel of the bed of material on said conveyor through said chamber, means for supplying conditioned gas to said supply ducts under sufficient pressure to levitate the material of the bed of material passing over the openings of said gas supply ducts, gas return duct means beneath said conveyor alternating with said supply duct means, and gas flow guide means comprising transverse partitions traveling with and above said conveyor and bed arranged to direct at least a part of the upflowing streams of gas to return locally as downflowing streams through said bed of material and restricting the flow of gas and material to a limited zone distance along the conveyor, said transverse partitions being spaced apart longitudinally of said conveyor by a distance greater than the length of the openings of said supply duct means to provide for some upflowing gas and some downflowing gas to pass through each space between transverse partitions in the travel of the bed of material on the conveyor.

19. Apparatus for treating fluent solid material comprising in combination, an enclosed treating chamber, a conveyor supporting a bed of material on a perforate bottom support for passage through said enclosure, gas supply duct means beneath said conveyor having openings at spaced points the length of the path of travel of the bed of material on the conveyor through said chamber, means for supplying conditioned gas to said supply ducts under sufficient pressure to levitate the material of the bed of material passing over the openings of said gas supply ducts, gas return duct means beneath said conveyor having openings alternating with said gas supply openings, and gas flow guide means above said conveyor and bed arranged to direct at least a part of the upflowing streams of gas to return locally as downflowing streams through said bed of material and restricting the flow of gas and material to a limited zone distance along the conveyor, said flow guide means including boxes with solid peripheral transverse and end walls, some of said peripheral walls sloping outwardly upwardly in an upward direction, the transverse walls of adjacent walls being in substantial interengagement and the end walls engaging the side walls of the chamber, whereby all upflowing and downflowing gases are caused to pass through said boxes, and the upflowing gases are caused to expand and lose velocity and drop material out of suspension.

20. Apparatus for treating fluent solid material, comprising in combination, an enclosure, a conveyor for transporting material through said enclosure, means forming longitudinally spaced compartments along the length of said conveyor and having a perforate bottom support for material above said conveyor, spaced gas supply boxes below the conveyor having perforate outlets beneath the conveyor, said compartments above the conveyor being formed to provide space for rising gas to first fluidize the material and then to cause the material to drop back toward the conveyor, means for supplying conditioned gas to all of said supply boxes beneath the conveyor, and gas return duct means beneath said conveyor alternating with said supply boxes whereby at least a portion of said rising gas reverses its flow while passing through said fluidized material to thereby effect rolling or tumbling of the material.

21. Apparatus as set forth in claim 20, in which the compartments are expanded upwardly and which further includes an overhead retaining screen disposed above the expanded upper end of said compartments.

References Cited by the Examiner

UNITED STATES PATENTS

| | | | |
|---|---|---|---|
| 1,707,929 | 4/1929 | Bennett | 34—31 |
| 2,365,769 | 12/1944 | Marshall | 34—10 X |
| 2,502,134 | 3/1950 | Erickson | 34—33 |
| 2,669,068 | 2/1954 | Wambreuze | 263—8 |
| 3,214,844 | 11/1965 | Oates et al. | 34—10 |

FOREIGN PATENTS 711,042  6/1954  Great Britain.

FREDERICK L. MATTESON, Jr., *Primary Examiner.*

JOHN J. CAMBY, *Examiner.*

D. A. TAMBURRO, *Assistant Examiner.*